United States Patent
Poppe et al.

(10) Patent No.: US 10,000,271 B2
(45) Date of Patent: Jun. 19, 2018

(54) DOOR CONSTRUCTION WITH GAP SEALING DEVICE AND METHOD FOR SEALING A GAP BETWEEN A DOOR AND A DOOR FRAME

(71) Applicant: Airbus Operations GmbH, Hamburg (DE)

(72) Inventors: Andreas Poppe, Hamburg (DE); Hermann Benthien, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days. days.

(21) Appl. No.: 14/607,906

(22) Filed: Jan. 28, 2015

(65) Prior Publication Data

US 2015/0210374 A1   Jul. 30, 2015

(30) Foreign Application Priority Data

Jan. 30, 2014 (EP) .................................... 14153197

(51) Int. Cl.
  *B64C 1/14* (2006.01)
  *E06B 7/23* (2006.01)
  *B60J 10/244* (2016.01)

(52) U.S. Cl.
  CPC .......... *B64C 1/1461* (2013.01); *B64C 1/1423* (2013.01); *E06B 7/23* (2013.01); *B60J 10/244* (2016.02)

(58) Field of Classification Search
  CPC ....... B64C 1/14; B64C 1/1423; B64C 1/1461; B64C 1/1407; E06B 7/23; B60J 10/244
  USPC ................. 244/129.1, 129.4, 129.5; 49/477.1
  See application file for complete search history.

(56) References Cited

U.S. PATENT DOCUMENTS

| | | | |
|---|---|---|---|
| 2,104,144 A | 1/1938 | Zand | |
| 2,361,298 A | 10/1944 | Laddon | |
| 2,665,459 A | 1/1954 | Lee | |
| 2,720,011 A * | 10/1955 | Krupp | B64D 15/02 277/646 |
| 2,910,209 A * | 10/1959 | Nelson | A61G 17/02 220/378 |
| 3,161,229 A * | 12/1964 | Sanders | E06B 7/2318 160/199 |
| 3,178,779 A * | 4/1965 | Clark | B64C 1/14 220/232 |
| 4,167,258 A * | 9/1979 | Robertson | B64C 1/1415 244/129.5 |

(Continued)

FOREIGN PATENT DOCUMENTS

GB          950062          2/1964

OTHER PUBLICATIONS

European Search Report, dated Jun. 13, 2014.

*Primary Examiner* — Jerry E Redman
(74) *Attorney, Agent, or Firm* — Greer, Burns & Crain, Ltd.

(57) ABSTRACT

A door construction for an airborne vehicle includes a door, a door frame, with the shape of door frame forming a gap between the door and the door frame in the outer surface of the door and the door frame when the door is closed, and a gap sealing device comprising an inflatable tube positioned in the gap with at least one tube inlet, the inflatable tube being configured to be inflated through the at least one tube inlet and to at least partially seal the gap between the door and the door frame when inflated.

8 Claims, 2 Drawing Sheets

(56) References Cited

U.S. PATENT DOCUMENTS

| | | | | |
|---|---|---|---|---|
| 4,761,917 A * | 8/1988 | Knecht | ............... | E06B 7/2318 |
| | | | | 296/207 |
| 5,046,285 A * | 9/1991 | Fratini, Jr. | ............ | E06B 7/2318 |
| | | | | 296/146.9 |
| 5,209,498 A * | 5/1993 | Colin | .................... | B61D 19/02 |
| | | | | 277/646 |
| 5,489,104 A * | 2/1996 | Wolff | .................... | B60J 10/244 |
| | | | | 277/646 |
| 5,979,828 A * | 11/1999 | Gruensfelder | ............ | B64C 1/14 |
| | | | | 244/129.1 |
| 6,009,669 A * | 1/2000 | Jardine | .................... | B64C 1/14 |
| | | | | 49/306 |
| 6,702,301 B1 * | 3/2004 | Davies | .................... | E06B 7/18 |
| | | | | 277/312 |
| 7,594,359 B2 * | 9/2009 | Keefe | ................... | F16J 15/064 |
| | | | | 49/475.1 |
| 8,091,831 B2 * | 1/2012 | Roming | ................... | B64C 1/14 |
| | | | | 244/129.4 |
| 8,555,552 B2 * | 10/2013 | Hooton | ................. | B60J 10/244 |
| | | | | 296/146.9 |
| 2005/0247823 A1 | 11/2005 | Wood et al. | | |
| 2008/0164373 A1 | 4/2008 | Roming | | |
| 2010/0065468 A1 * | 3/2010 | Chiu | ................ | H01L 21/67376 |
| | | | | 206/711 |
| 2011/0233334 A1 * | 9/2011 | Stephan | ................... | B64C 1/10 |
| | | | | 244/119 |
| 2012/0317887 A1 * | 12/2012 | Duelli | .................... | F16J 15/46 |
| | | | | 49/477.1 |
| 2015/0210374 A1 * | 7/2015 | Poppe | ................... | B64C 1/1461 |
| | | | | 49/477.1 |

* cited by examiner

DOOR CONSTRUCTION WITH GAP SEALING DEVICE AND METHOD FOR SEALING A GAP BETWEEN A DOOR AND A DOOR FRAME

CROSS-REFERENCES TO RELATED APPLICATIONS

This application claims the benefit of the European patent application No. 14153197.0 filed on Jan. 30, 2014, the entire disclosures of which are incorporated herein by way of reference.

FIELD OF THE INVENTION

The present invention relates to a gap sealing device and a method for sealing a gap between a door and a door frame, particularly for use in doors of airborne vehicles.

BACKGROUND OF THE INVENTION

Aircraft have openings in the outer surface of the empennage and/or fuselage for functional reasons. For example, windows or doors are provided within cutouts of the fuselage of an aircraft. Due to the cutouts in the otherwise smooth surface of the fuselage gaps, trenches, slits, furrows, lacunae, grooves or crevices may be present in the surface of the fuselage between adjoining cutout edges and edges of the components arranged within the cutout.

When airborne, such gaps tend to create turbulences in the airflow along the fuselage, which on one hand create additional noise and on the other hand additional drag, both of which are undesirable properties for an aircraft.

Document U.S. Pat. No. 2,104,144 A discloses an airplane door construction having a pneumatic tube sealing the juncture between a door of an aircraft and its respective frame.

Document U.S. Pat. No. 5,979,828 A discloses an apparatus for eliminating gaps in the doorframe of an aircraft that uses an elastomeric bladder which may be inflated with a pneumatic actuator.

SUMMARY OF THE INVENTION

One idea of the invention is to provide solutions to effectively combat noise and drag that occurs due to air streaming by a gap between a door and a door frame of an airborne vehicle.

A first aspect of the invention thus pertains to a door construction for an airborne vehicle, the door construction comprising a door, a door frame, with the shape of door frame forming a gap between the door and the door frame in the outer surface of the door and the door frame when the door is closed, and a gap sealing device comprising an inflatable tube and at least one tube inlet, the inflatable tube being configured to be inflated through the at least one tube inlet and to at least partially seal the gap between the door and the door frame when inflated.

A second aspect of the invention pertains to an airborne vehicle comprising at least one door construction according to the first aspect of the invention.

A third aspect of the invention pertains to a method for sealing a gap between a door and a door frame comprising providing a door and a door frame as part of a fuselage construction, with the shape of door frame forming a gap between the door and the door frame in the outer surface of the door and the door frame when the door is closed, pressurizing the inside of the fuselage construction to create a pressure difference between the inside of the fuselage construction and the outside of the fuselage construction, and inflating an inflatable tube from the inside of the fuselage construction through at least one tube inlet by virtue of the pressure difference to at least partially seal the gap between the door and the door frame with the inflated inflatable tube.

The idea on which the present invention is based is to use an inflatable tube as gap sealing device that may be inflated from the inside of an aircraft to extend between a door and a door frame, thereby filling any gap, lacuna or groove between the door and a door frame. An inlet of the inflatable tube is attached to a bore, hole or opening in one of the fuselage components so that the inner walls of the bore, hole or opening together with the inside surface of the tube form a flexible extension of the inner side of the fuselage.

The inflatable tube will be deflated in an airborne vehicle employing such a gap sealing device. Upon closing the door and building up a pressure difference between the inside of the fuselage and the outside, for example when the airborne vehicle rises to higher altitudes, the inflatable tube will automatically inflate from the inside of the fuselage with the tube main body substantially conforming to the shape of gap, lacuna or groove between the door and the door frame.

Several advantages may be achieved by using this construction. First of all, the size of the empty space between the door and the door frame will be reduced, thus reducing turbulences occurring in airflow along the fuselage in the vicinity of the door construction. This in turn will lead to reduced drag count due to the better laminar profile of the airflow, thus reducing fuel consumption and improving maneuverability of the airborne vehicle. Finally, the "whistling effect" of air streaming over an empty space between two edges projecting laterally in the airstream will diminish as well so that noise created by the presence of a door gap in the fuselage will become less disruptive, thereby increasing passenger comfort for passengers within the airborne vehicle.

Furthermore, due to the nature of the inflating mechanism of the gap sealing device, reduction of the pressure difference between the inside and the outside of the fuselage will lead to an automatic deflation of the inflatable tube. This will improve the safety of the airborne vehicle since the presence of the gap sealing device will not be detrimental to the ease of opening the door in situations where deployment of the doors is desired, for example in emergency evacuation situations, i.e., when the fuselage is depressurized anyway.

According to an embodiment of the door construction, the door may comprise at least one bore introduced into the door edge, the bore fluidly connecting the inside of the door construction to the outside of the door construction, and the at least one tube inlet may be fixedly attached to the inner walls of the at least one bore.

According to an alternative embodiment of the door construction, the door frame may comprise at least one bore introduced into the door frame, the bore fluidly connecting the inside of the door construction to the outside of the door construction, and the at least one tube inlet may be fixedly attached to the inner walls of the at least one bore.

According to another embodiment of the door construction, the inflatable tube may comprise an elastomeric material. In that embodiment, the contact surface of the inflatable tube with the side walls of the gap may be resistant to freezing of the inflatable tube to the side walls of the gap.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

Figure 1:
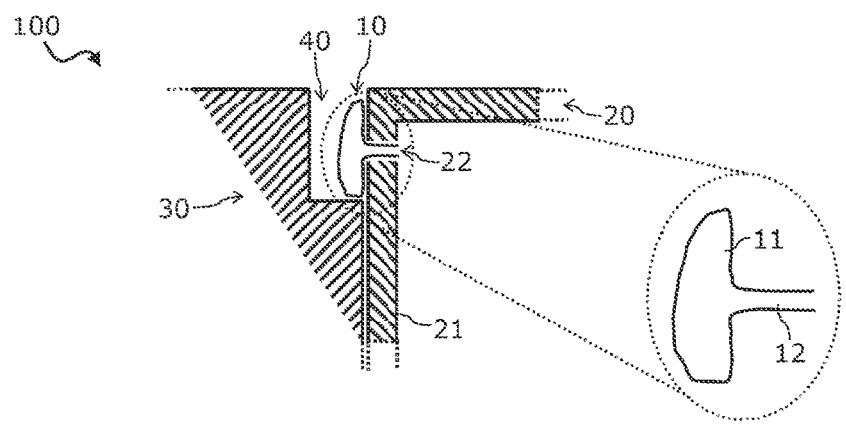
FIG. 1 schematically illustrates a door construction of an airborne vehicle with a gap sealing device according to an embodiment of the invention in a first operational state.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

FIG. 1 schematically illustrates a sectional view of a door construction 100 of an airborne vehicle, such as an aircraft or spacecraft. The door construction 100 is equipped with a gap sealing device 10 which is shown to reside in a first operational state. The first operational state may be a state in which the airborne vehicle is located on the ground where the atmospheric pressure is usually both the same on the inside and the outside of the airborne vehicle. The door construction 100 may be implemented in the surface of a fuselage construction of the airborne vehicle. In particular, the door construction 100 may comprise a door 20 and a door frame 30, the door frame 30 being an integral part of the fuselage construction. The door 20 and the door frame 30 may be shaped such that a gap, groove or furrow 40 is formed between the door 20 and the door frame 30 in the outer surface of the door 20 and the door frame 30 when the door 20 is closed. The outer surface of the door 20 and the door frame 30 may form part of the outer fuselage shell.

The door 20 may comprise a bore, hole or opening 22 introduced in the door edge 21, for example by drilling, boring, hole-punching, perforating or similar techniques. The door edge 21 may comprise a frame, a crossbeam, a rib or a similar reinforced structure through which the opening 22 may be formed. Generally, the opening 22 may connect the inside of the fuselage (for example, the passenger cabin) to the outside of the fuselage, i.e., the external space outside the airborne vehicle. The opening 22 may for example be a cylindrical hole having a diameter of several millimeters to several or a dozen centimeters. It may also be possible to provide multiple openings 22 adjacent to each other within the door edge 21, spaced apart from each other.

The gap sealing device 10 of FIG. 1 is shown in greater detail in the magnified view. The gap sealing device 10 may generally comprise an inflatable tube 11 that comprises an interior cavity which in turn is in fluid communication to the outside by means of at least one tube inlet 12. The tube inlet 12 may in particular be formed integrally with the inflatable tube 11 and may be in the shape of an elongated ingress/egress port. It may also be possible to equip the entrance of the tube inlet 12 with a (not explicitly illustrated) plug valve.

The main body of the inflatable tube 11 may have an elongated shape that generally conforms to the groove formed between the door 20 and the door frame 30. For example, the inflatable tube 11 may have the shape of a cylindrical channel or pipe that extends along one side face of the door 20 and the door frame 30, respectively. The inflatable tube 11 may further comprise more than one tube inlet 12 which are spaced apart from each other along the same side of the elongated shape of the inflatable tube 11. In particular, the multitude of tube inlets 12 may be arranged at the inflatable tube 11 so as to correspond with the positions of the openings 22 in the door edge 21.

The tube inlets 12 may then be introduced into the openings 22 and sealingly fixed with their respective outer side faces to the inner walls of the openings 22, respectively. It may for example be possible to clamp the tube inlets 12 into the openings 22. Alternatively or additionally, it may be possible to introduce adhesive materials into the openings 22 and to glue the tube inlets 12 to the openings 22. In any case, it is desirable to fix the tube inlets 12 within the bores 22 so that the interior cavity of the inflatable tube 11 is in fluid communication with the interior of the fuselage and that the gap sealing device 10 hermetically seals off the outside of the fuselage from the inside of the fuselage.

The inflatable tube 11 may for example comprise an elastomeric expandable main body which may comprise rubber, for example material used in conventional sealings of aircraft. In the first operational state of the gap sealing device 10, the pressure difference between the outside of the fuselage and the inside of the fuselage is zero or approximately zero. Therefore, the inflatable tube 11 will be generally deflated and not fill out the gap or empty space 40 between the door 20 and the door frame 30.

The gap 40 between the door 20 and the door frame 30 may for example be 2 mm to 4 mm in width, as the cutout is provided between two adjacent frames in the fuselage which are nearer to each other in the region of the door 20 than in the remaining fuselage. The space created by this cutout region may be used for stowing the deflated gap sealing device 10.

Figure 2:
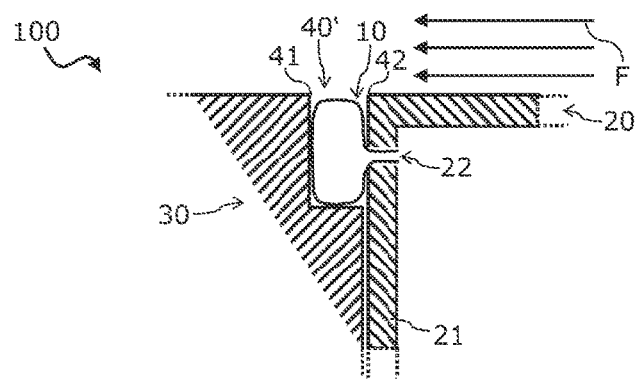
FIG. 2 schematically illustrates the door construction of FIG. 1 with a gap sealing device according to an embodiment of the invention in a second operational state.

As shown in FIG. 2, upon pressurizing the inside of the fuselage, for example in flight of the airborne vehicle employing the door construction 100, the inflatable tube 11 will enter a second operational state by becoming inflated due to the pressure difference between the outside of the fuselage and the inside of the fuselage. Air will stream through the tube inlet 12 and expand the inflatable tube 11, thereby filling out the gap 40 between the door 20 and the door frame 30. The shape of the inflatable tube 11 will—depending on the particular elasticity of the material—substantially conform to the outer shape of the gap 40, thereby decreasing its effective depth to a gap 40' of decreased dimensions. The material of the inflatable tube 11 may be chosen in consideration of the choice of materials for the door 20 and the door frame 30 in order to prevent the material of the inflatable tube 11 from sticking to the door frame 30. Especially during flight, where moisture and dirt may adhere to the inflatable tube 11, the door 20 and the door frame 30, it is undesirable to have the inflatable tube 11 irremovably freeze to the door frame 30, thereby possibly preventing the door 20 from being easily opened in emergency situations where the fuselage is depressurized. Thus, the contact surface of the inflatable tube 11 with the side walls of the gap 40 is selected to be resistant to freezing of the inflatable tube 11 to the side walls of the gap 40, taking into account the needed durability against low temperatures, high pressure differences and mechanical impact due to solid objects such as protruding metal edges within the gap 40.

The inflatable tube 11 may have a tube wall thickness of one or several tenths of millimeters. To prevent the inflatable tube 11 from bulging out of the gap 40 when inflated, the tube material may be chosen with appropriate stiffness and ruggedness. Generally, the deflated tube 11 will take up only a fraction of the empty space of the gap 40, while the tube 11 will take up substantially the fully space of the gap 40 when inflated.

It may be possible to provide a similar inflatable tube 11 at the other side of the door 20 or the door frame 30, respectively, in order to build up a counterforce when inflating both tubes 11. The pressure of the opposing tubes 11 acting upon the door 20 may thus be effectively counterbalanced so that the door 20 will not become misaligned due to the pressurized tubes 11.

Upon sealing the gap 40 with the gap sealing device 10, the effective gap 40' will have reduced dimensions, especially a reduced depth. Therefore, an airstream F streaming by the gap 40' will become perturbed less between the frame rim 41 and the door rim 42. Thus, the "whistling effect" of air streaming over the frame rim 41 and the door rim 42 and producing noise will be diminished due to the reduced size of the resonant body between the two rims. Moreover, the additional drag induced by perturbations in the airstream F will be diminished as well.

Figure 3:
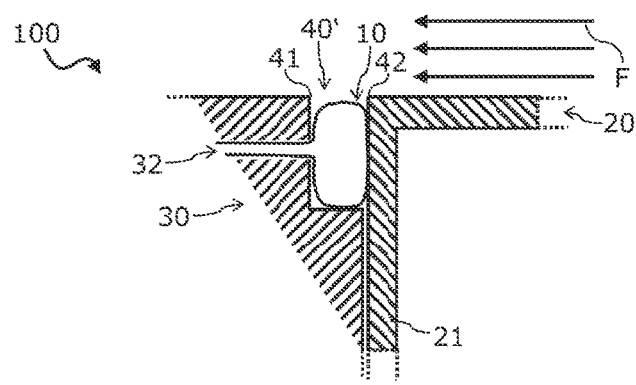
FIG. 3 schematically illustrates a door construction of an airborne vehicle with a gap sealing device according to another embodiment of the invention.

FIG. 3 schematically illustrates a sectional view of a door construction 100 of an airborne vehicle in another variant. In contrast to the door construction 100 of FIGS. 1 and 2, the door frame 30 comprises one or more openings 32 (similar to the openings 22 of FIGS. 1 and 2) which are used to affix the tube inlet(s) 12 to the door frame 30. The general operation of the gap sealing device 10 will substantially remain unaffected, with air streaming through the tube inlet(s) 12 in the bores 32 to inflate the inflatable tube 11 when the airborne vehicle becomes airborne, i.e., the fuselage interior is relatively pressurized.

Figure 4:
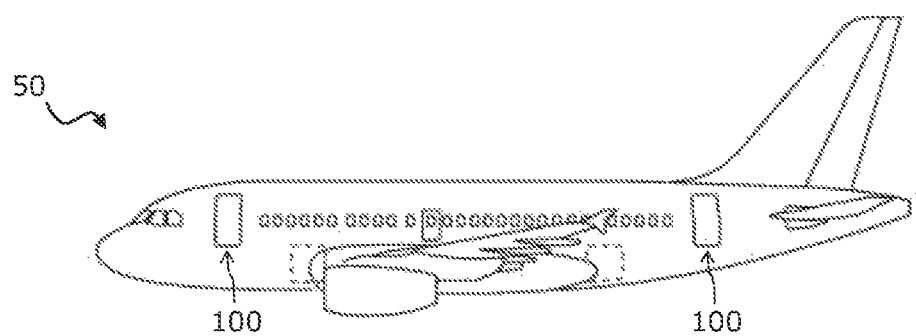
FIG. 4 schematically illustrates an airborne vehicle having a door construction with a gap sealing device according to yet another embodiment of the invention.

FIG. 4 schematically illustrates an airborne vehicle, such as an aircraft 50 having at least one door construction 100 as depicted in and explained in conjunction with one or more of the FIGS. 1 to 3. The door constructions 100 may, for example, be employed in a passenger door, a cargo bay entrance, a luggage loading door, an emergency exit or similar entrances or exits to and from the aircraft 50.

Figure 5:
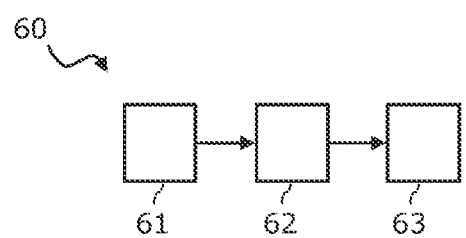
FIG. 5 schematically illustrates a method for sealing a gap between a door and a door frame according to yet another embodiment of the invention.

FIG. 5 schematically illustrates a method 60 for sealing a gap between a door and a door frame, in particular a gap such as the gap 40 between a door 20 and a door frame 30 as shown and explained in conjunction with one of the FIGS. 1 to 3. The method 60 may particularly be employed in an airborne vehicle, such as the aircraft 50 in FIG. 4.

The method 60 comprises as a first step 61 providing a door 20 and a door frame 30 as part of a fuselage construction, with the shape of door frame 30 forming a gap 40 between the door 20 and the door frame 30 in the outer surface of the door 20 and the door frame 30 when the door 20 is closed. In a second step 62, the inside of the fuselage construction may be pressurized to create a pressure difference between the inside of the fuselage construction and the outside of the fuselage construction, for example when the airborne vehicle 50 becomes airborne. Finally, in a third step 63, an inflatable tube 11 may be inflated from the inside of the fuselage construction through at least one tube inlet 12 by virtue of the pressure difference to at least partially seal the gap between the door 20 and the door frame 30 with the inflated inflatable tube 11.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The invention claimed is:

1. A door construction for an airborne vehicle, the door construction comprising:
   a door;
   a door frame, with a shape of the door frame forming a gap between the door and the door frame in an outer surface of the door and the door frame when the door is closed; and
   a gap sealing device comprising an inflatable tube and at least one tube inlet, the inflatable tube being configured to be inflated through the at least one tube inlet and to at least partially seal the gap between the door and the door frame when inflated, the inflatable tube having an interior cavity in fluid communication with an interior of a fuselage of the airborne vehicle, wherein, upon pressurizing an inside of the airborne vehicle, the inflatable tube is configured to become inflated due to a pressure difference between an outside of the airborne vehicle and the inside of the airborne vehicle, the at least one tube inlet of the inflatable tube being attached to a bore, hole or opening in one of the fuselage components of the fuselage of the airborne vehicle so that the inner walls of the bore, hole or opening together with an inside surface of the inflatable tube form a flexible extension of an inner side of the fuselage of the airborne vehicle, the at least one tube inlet of the inflatable tube being attached to a bore, hole or opening in one of the fuselage components of the fuselage of the airborne vehicle so that the inner walls of the bore, hole or opening together with an inside surface of the inflatable tube form a flexible extension of an inner side of the fuselage of the airborne vehicle.

2. The door construction according to claim 1, wherein the door comprises at least one opening introduced into an edge of the door, the opening fluidly connecting an inside of the door to an outside of the door and the door frame, and wherein the at least one tube inlet is fixedly attached to inner walls of the at least one opening.

3. The door construction according to claim 1, wherein the door frame comprises at least one opening introduced into the door frame, the opening fluidly connecting an inside of the door frame to an outside of the door and the door frame, and wherein the at least one tube inlet is fixedly attached to inner walls of the at least one opening.

4. The door construction according to claim 1, wherein the inflatable tube comprises an elastomeric material.

5. The door construction according to claim 4, wherein a contact surface of the inflatable tube with side walls of the gap is resistant to freezing of the inflatable tube to the side walls of the gap.

6. The door construction according to claim 1, wherein the tube inlet is configured to let air stream through the tube inlet, and wherein the inflatable tube is configured to expand and thereby fill out the gap between the door and the door frame.

7. An airborne vehicle comprising at least one door construction comprising:
   a door;
   a door frame, with a shape of the door frame forming a gap between the door and the door frame in an outer surface of the door and the door frame when the door is closed; and
   a gap sealing device comprising an inflatable tube and at least one tube inlet, the inflatable tube being configured to be inflated through the at least one tube inlet and to at least partially seal the gap between the door and the door frame when inflated, the inflatable tube having an interior cavity in fluid communication with an interior of a fuselage of the airborne vehicle, wherein, upon pressurizing an inside of the airborne vehicle, the inflatable tube is configured to become inflated due to a pressure difference between an outside of the airborne vehicle and the inside of the airborne vehicle, the at least one tube inlet of the inflatable tube being attached to a bore, hole or opening in one of the fuselage components of the fuselage of the airborne vehicle so that the inner walls of the bore, hole or opening together with an inside surface of the inflatable tube form a flexible extension of an inner side of the fuselage of the airborne vehicle.

8. A method for sealing a gap between a door and a door frame, the method comprising:
   providing a door and a door frame as part of a fuselage construction, with a shape of the door frame forming a gap between the door and the door frame in an outer surface of the door and the door frame when the door is closed;
   pressurizing an inside of the fuselage construction to create a pressure difference between the inside of the fuselage construction and an outside of the fuselage construction; and
   inflating a gap sealing device comprising an inflatable tube positioned in the gap from the inside of the fuselage construction through at least one inlet of the tube by means of the pressure difference between the inside of the fuselage construction and the outside of the fuselage construction to at least partially seal the gap between the door and the door frame with the inflated inflatable tube, the inflatable tube having an interior cavity in fluid communication with an interior of a fuselage of the airborne vehicle, the at least one tube inlet of the inflatable tube being attached to a bore, hole or opening in one of the fuselage components of the fuselage of the airborne vehicle so that the inner walls of the bore, hole or opening together with an inside surface of the inflatable tube form a flexible extension of an inner side of the fuselage of the airborne vehicle, the at least one tube inlet of the inflatable tube being attached to a bore, hole or opening in one of the fuselage components of the fuselage of the airborne vehicle so that the inner walls of the bore, hole or opening together with an inside surface of the inflatable tube form a flexible extension of an inner side of the fuselage of the airborne vehicle.

\* \* \* \* \*